ARRANGEMENT FOR REMOTE CONTROL OVER THE TELEPHONE NETWORK
Filed Dec. 12, 1967
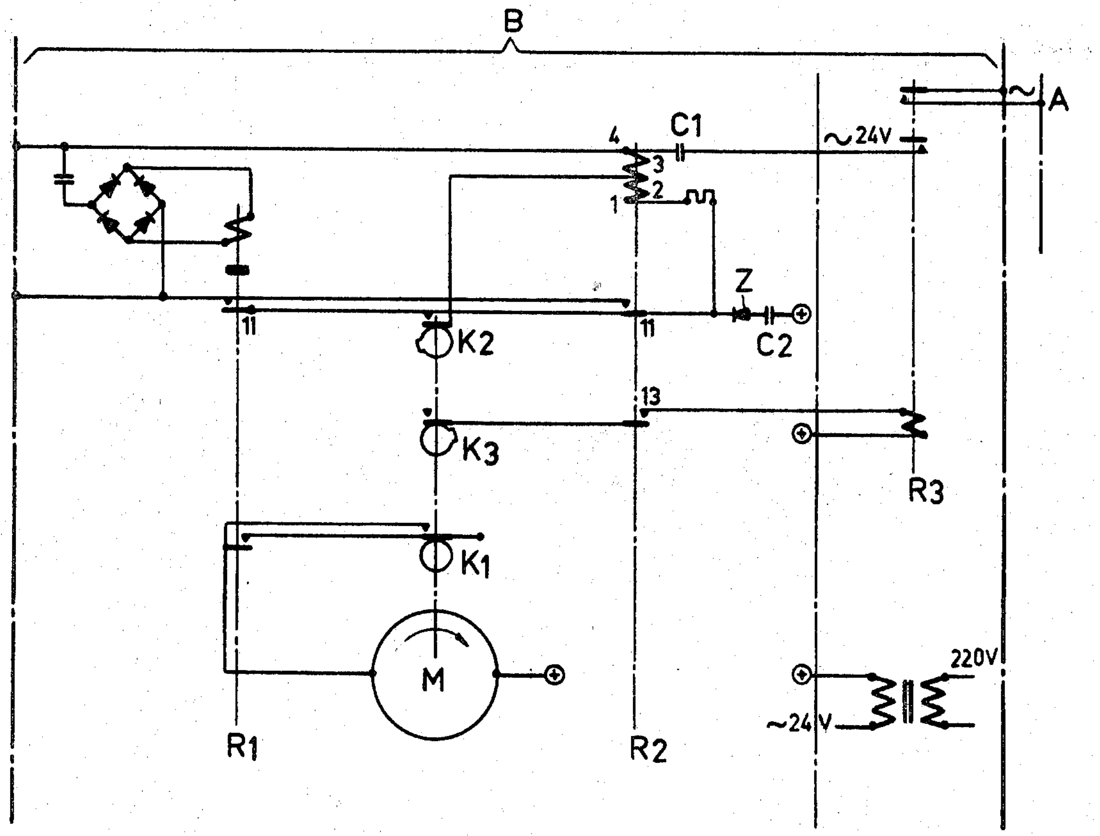

3,538,255
ARRANGEMENT FOR REMOTE CONTROL OVER THE TELEPHONE NETWORK

Ivan W. Grundin, Upplandsgat. 17, Stockholm, Sweden; and Gustaf Uno Tinglöf, Nykroppog. 19; and Hilding Tolly Hjelm, Sockerbagarvagen 15, both of Farsta, Sweden Filed Dec. 12, 1967, Ser. No. 689,963
Int. Cl. H04m 11/00
U.S. Cl. 179—2 8 Claims

ABSTRACT OF THE DISCLOSURE

A system is controlled from a remote point by ringing a telephone in communication with a device for controlling the system. Three cams are rotated in unison as soon as the telephone rings each cam corresponding to three subsequent time periods, the first and second periods being of a predetermined length such as 60 sec. each, the third of the periods having an optional length and effective to actuate the control equipment device to turn on the system provided the caller holds the handset off the telephone cradle at least until the beginning of the third period.

It has been proposed previously to switch on electric switches over a telephone circuit by two calls with a predetermined time interval between the calls. For turning the switch off, two additional telephone calls made later on with a correct time interval are required. An arrangement of this type is impractical and, besides, it does not conform with the requirements made on the public telephone system, for example with respect to call metering. It also is previously known to connect automatic telephone answering machines in telephone circuits.

For remote control over the telephone system, however, it is desired in principle that the control can be effected only by the proper person. It is, however, relatively expensive to make such an arrangement. Moreover, for obtaining full security, this requires that the control can be effected only from a certain place where special equipment for transmitting the control signal has been mounted. In certain cases of remote control of a simpler nature, however, unauthorized operation of the control has only a moderate damaging effect and, therefore, a smaller degree of security can be accepted. In return, an arrangement for remote control can be established at a low cost, which arrangement without any additional signal transmitting equipment can be operated from any telephone set in the public system and wherein the call metering is made in agreement with the requirements prescribed.

The present invention is intended for use in certain cases of remote control, for example for operating electric heating systems in weekend cottages which are connected to the electric mains. For excluding to a certain degree the possibly that an unauthorized person unintentionally operates the arrangement, the arrangement was designed with a predetermined program comprising three parts. The operation can be initiated from any telephone set which is connected to the public system.

The person who has called the place having equipment to be controlled hears during the first part of the program 60 seconds of the usual ringing tone, followed by 60 seconds of silence as the second part. Thereafter, as the third part, of the program, the adjustment of the control equipment at the receiving place is effected. A person who has called the wrong number can be assumed to get tired of waiting sometime during the first part of the program and even the most patient caller will replace the receiver during the 60 silent seconds. When in the third part of the program the adjustment is being effected, a humming tone is sent to the caller as a confirmation that the adjustment has been carried out. The humming tone originates from the alternating current of the electric mains.

The function of the arrangement is described in the following by way of an embodiment of the invention with reference to the accompanying drawing.

The arrangement comprises a remote control relay set B and is connected with the telephone central office via a usual two-wire subscriber's line. At the subscriber's place there may also be a telephone mounted, in such a manner, that alternatively the arrangement or the telephone is connected to the subscriber's line by a make-and-break switch.

Upon an incoming ringing signal a relay R1 is attracted, and over a contact on relay R1 a motor M is started. A cam K1 on the motor M immediately closes its contact, and thereafter the motor M is driven over this contact, as the relay R1 drops when the ringing signal ceases. Relay R1 again attracts for a short period at any ringing signal, but nothing else happens. After 60 seconds a cam K2 closes its contact, whereafter upon the next ringing signal the low resistance winding on relay R3 is connected to the telephone line via the contacts of cam K2 and via R1/11. Thereby a registration is made in the telephone central office that the arrangement has answered and, therefore, the ringing signals cease. After a period of, for example, five seconds the contact on cam K2 is broken, but the relay R2 receives holding current from the telephone central office through its high resistance winding via contact R2/11. Since the ringing signals had ceased, it is now completely silent in the telephone of the caller.

After a period of further sixty seconds the cam K3 closes its contact for a short period. Thereby a current pulse is sent via K3 and R2/13 to the impulse relay R3. This relay is switched to its closed position, whereby current is connected both to the remote controlled heating installation A and via condensers C1 and C2 and a Zener diode Z to the telephone line. The caller then hears a sound consisting of the overtone which is produced when the 50-cycle alternating current passes through the Zener diode.

The high resistance shown by R2 to the telephone central office after K2 has ceased to be closed is understood by the office as the clearing signal from the arrangement. If the caller replaces the handset prior to the readjustment, this means that the telephone central office has received the clearing signal from both parties in the telephone connection. The office then changes the direction of the current to the control arrangement, whereby relay R2 drops. When thereafter K3 closes, R2/13 is broken and no current pulse is sent to the impulse relay and, therefore, no readjustment is made. It is, thus, possible to call and control whether the heating installation is operating, without thereby effecting a readjustment.

It further is possible to call and reset an installation already adjusted and put in operation. In this case, during the sixty seconds which previously were silent, now is heard the tone indicating that the heating installation is in operation. After the sixty seconds have ceased, a current pulse is sent as before to the impulse relays R3 which thereby is reset to its broken position. It is then completely silent in the caller's telephone, which indicates that the heating installation is disconnected.

The arrangement comprises as the most important component a program unit which is driven by an alternating current motor. The program unit has a cycle time of, for example, two minutes and is provided with four cams which a.o. divide the cycle time into two periods of one minute each. The first period is completed by a B-reply in about five seconds, and the second period is completed by the readjustment function for the heat produced by electric elements, i.e. the heat is switched on, when it was switched off, and vice versa. The equipment can be called from any telephone set, and as no legitimation is required, the calling station need not be provided with a special attachment. From the point of the caller, the equipment operates as follows.

When the subscriber was leaving the cottage, he disconnected by a switch the telephone from the line and, instead, connected a remote control relay set B. When the subscriber thereafter intends to switch on the heat by remote control, he calls his telephone number to the cottage. Thereby the program unit is started and the subscriber hears the ringing tone for one minute (the first period of the program unit). The B-reply made after about 5 seconds by the program unit is not noticed by the subscriber except that the ringing tone ceases. The B-reply serves two objects, viz to provide call metering and to prevent that automatic test equipments register a wrong connection. After the ringing tone has ceased, there will be silence for one minute, i.e. during the second period of the program unit.

This silent minute was established for making a wrong caller to become tired in continuing the call and to cause him to replace the handset. When the second one-minute period is completed (totally after two minutes), the heat is switched on and the calling subscriber hears a tone constituted of 60-cycle alternating current if that is the frequency of the current in the mains which by the Zener diode is given overtones. By using alternating current, the subscriber gets information even on mains failure, because the aforesaid signal then does not come off. If the subscriber wishes the heat to be disconnected, a new call must be made to the cottage. This call differs from the foregoing call as follows. Immediately after the B-reply at the beginning of the second one-minute period, the subscriber hears the alternating current tone as an indication that the heat is switched on.

If the subscriber wishes to merely control that the heat is switched on, without switching off the heat, he only has to replace the handset within the second one-minute period. If, however, the subscriber desires to switch off the heat, he must wait until the end of the second period, when the tone ceases and thereby indicates that the heat has been switched off. For every call made on this number, thus, a readjustment of the heat is effected, provided that the caller maintains the call connected for a total of two minutes. For calls shorter than two minutes, no readjustment takes place.

For effecting these functions, three of the cams of the program unit are applied. A fourth cam (not shown) may be used, for example, for giving other information to the caller, for example burglar alarm.

The arrangement is adapted for the remote control of every kind of electric apparatuses mounted in apartments or public buildings, particularly those which produce heat and/or light.

The division of the time period, of course, can be varied with respect to length.

What we claim is:

1. An arrangement for remote control, over the public telephone system, of control equipment installed at a receiving station comprising indicating means connected to the subscriber's line at said receiving station for indicating calling tone signals transmitted from a central office to the receiving station and initiated by a telephone in the telephone system, a program unit receiving an initiating signal from said indicating unit in response to said calling tone signals, said program unit having first means receiving said initiating signal and operable to initiate a first period in which said central station transmits a calling tone to the calling party, said program unit having second means operable upon termination of said first period to initiate a second period, said second means initially connecting a hook-off simulating circuit device to the subscriber's line so that the transmission of said calling tone from the central office to the calling party is terminated, and then connecting a hook-on simulating circuit device to the subscriber's line during the balance of the second period, said second period corresponding to the condition where said telephone of the calling party is silent and no ringing signal is received by said telephone, said program further comprising third means operable, if the connection is still held by the calling party beyond said second period, to initiate a third time period to actuate, in response to the voltage maintained in the subscriber's line, a contact means for connecting an initiating circuit, preset during one of said first and second time periods, to a switching means for switching said control equipment at said receiving station.

2. An arrangement according to claim 1, wherein said hook-off simulating circuit device is a low resistivity resistance, and said hook-on simulating circuit device is a high resistivity resistance.

3. An arrangement according to claim 2, wherein there is provided means for disconnecting said high resistivity resistance, in response to the change in voltage supplied to the subscriber line by the central office caused by a terminating signal from the calling party, in order to prevent the presetting of the initiating circuit for said switching means and, thus, to prevent the switching of the control equipment.

4. An arrangement according to claim 2, wherein said switching means is adapted to, simultaneously with the switching-on of the control equipment, also connect a signal transmitting device to the subscriber's line for enabling the transmission of a special audio signal to the calling party represented by the A.C. current noise from the network.

5. An arrangement according to claim 4, wherein the means for connecting the hook-off simulating circuit device to the subscriber line also is effective after its having being operated after said first time period, to establish a connection of the signal transmitting device to the subscriber line in case the control equipment is already switched-on when the calling party performs the call.

6. An arrangement according to claim 1, wherein the program unit comprises a motor and three cams rotatable by the motor, one of the cams actuating a first contact to close the supply circuit for the motor when the program unit is supplied with the initiating signal from said indicating means, and then to maintain said supply circuits closed for a certain duration, the second of the cams actuating a contact for connecting the hook-off simulating circuit device to the subscriber line, after said first time period, and the third of the cams actuating said contact means for connecting the initiating circuit to the switching means after the second time period.

7. An arrangement according to claim 1, wherein said switching means is a pulse relay having two states, said relay being responsive to an actuating pulse to change its state and to remain in this state until a subsequent pulse resets the relay.

8. An arrangement according to claim 2, wherein the high resistivity and the low resistivity resistances are a high resistivity and a low resistivity winding, respectively, of a control relay connected in circuit with the subscriber line, said relay being actuated by the D.C. voltage supplied from the central office in response to the connection of the low resistivity winding, and remaining actuated also when the high resistivity winding is connected in circuit until the calling party terminates his call.

References Cited

UNITED STATES PATENTS

| | | |
|---|---|---|
| 2,726,377 | 12/1955 | Hammer. |
| 3,094,588 | 6/1963 | Kienast. |

RALPH D. BLAKESLEE, Primary Examiner